United States Patent
Wu et al.

(10) Patent No.: US 11,555,091 B2
(45) Date of Patent: Jan. 17, 2023

(54) COMPOSITION WITH REDUCED ALDEHYDE EMISSION

(71) Applicant: Huntsman International LLC, The Woodlands, TX (US)

(72) Inventors: Pengfei Wu, Shanghai (CN); Lies Bonami, Aalter (BE); Yuefan Zhang, Shanghai (CN); Joris Karel Peter Bosman, Herselt (BE); Xuerong Zhu, Shanghai (CN); Ingrid Welvaert, Leuven (BE)

(73) Assignee: Huntsman International LLC, The Woodlands, TX (US)

( * ) Notice: Subject to any disclaimer, the term of this patent is extended or adjusted under 35 U.S.C. 154(b) by 51 days.

(21) Appl. No.: 16/768,978

(22) PCT Filed: Dec. 13, 2018

(86) PCT No.: PCT/EP2018/084656
§ 371 (c)(1),
(2) Date: Jun. 2, 2020

(87) PCT Pub. No.: WO2019/121273
PCT Pub. Date: Jun. 27, 2019

(65) Prior Publication Data
US 2021/0221942 A1    Jul. 22, 2021

(30) Foreign Application Priority Data

Dec. 18, 2017 (WO) ................ PCT/CN2017/116892

(51) Int. Cl.
| | | |
|---|---|---|
| C08G 18/66 | (2006.01) | |
| C08G 18/08 | (2006.01) | |
| C08G 18/18 | (2006.01) | |
| C08G 18/32 | (2006.01) | |
| C08G 18/48 | (2006.01) | |
| C08G 18/76 | (2006.01) | |
| C08J 9/00 | (2006.01) | |
| C08J 9/12 | (2006.01) | |
| C08K 5/42 | (2006.01) | |
| C08G 101/00 | (2006.01) | |

(52) U.S. Cl.
CPC ..... *C08G 18/6688* (2013.01); *C08G 18/0838* (2013.01); *C08G 18/14* (2013.01); *C08G 18/1833* (2013.01); *C08G 18/3275* (2013.01); *C08G 18/4816* (2013.01); *C08G 18/4841* (2013.01); *C08G 18/7664* (2013.01); *C08J 9/0033* (2013.01); *C08J 9/125* (2013.01); *C08K 5/42* (2013.01); *C08G 2101/00* (2013.01); *C08G 2110/0058* (2021.01); *C08G 2110/0083* (2021.01); *C08J 2201/022* (2013.01); *C08J 2203/10* (2013.01)

(58) Field of Classification Search
CPC .... C08G 18/0838; C08G 18/14; C08G 18/18; C08G 18/1833; C08G 18/3275; C08G 18/4816; C08G 18/4833; C08G 18/4841; C08G 18/6688; C08G 18/7664; C08G 2101/00; C08G 2110/0058; C08G 2110/0083; C08J 9/0033; C08J 9/125; C08J 2201/022; C08J 2203/10; C08K 5/42; C08L 75/08
See application file for complete search history.

(56) References Cited

U.S. PATENT DOCUMENTS

| | | | |
|---|---|---|---|
| 2004/0171765 A1* | 9/2004 | Tsuji | C08G 18/10 |
| | | | 525/452 |
| 2006/0141236 A1 | 6/2006 | Nakamura et al. | |
| 2013/0203880 A1 | 8/2013 | George et al. | |
| 2016/0304686 A1 | 10/2016 | Otero Martinez | |
| 2016/0304687 A1 | 10/2016 | Otero Martinez | |
| 2017/0218157 A1* | 8/2017 | Lee | C08G 18/3281 |

FOREIGN PATENT DOCUMENTS

| | | |
|---|---|---|
| CN | 104321360 | 1/2015 |
| CN | 105992782 | 10/2016 |
| EP | 1428847 A1 | 6/2004 |
| JP | 2005124743 A | 5/2005 |
| JP | 2005137601 A | 6/2005 |
| JP | 2005154599 A | 6/2005 |
| WO | 2015/110403 A1 | 7/2015 |
| WO | 2016/166008 | 10/2016 |

(Continued)

OTHER PUBLICATIONS

International Search Report received in corresponding PCT Application PCT/EP2018/084656 dated Apr. 8, 2019 and completed Mar. 27, 2019.

(Continued)

*Primary Examiner* — John M Cooney
(74) *Attorney, Agent, or Firm* — Huntsman International LLC

(57) ABSTRACT

This invention generally provides composition for making a polyurethane foam with reduced aldehyde emission and more specially to composition useful in means of transport such as interior part of cars, wherein composition is comprising: (a) a polyfunctional isocyanate; (b) an isocyanate reactive composition; and (c) a compound of the formula (I) or (II), wherein the compound (c) is present by weight percentage in the composition in an amount ranging from about 0.001 to about 10, preferably from about 0.01 to about 5, and more preferably from about 0.05 to about 2 based on the total weight of the composition. The compositions can reduce aldehyde emission, especially acetaldehyde emission in the PU foam and has no obvious influence on the mechanic properties of the foam.

14 Claims, No Drawings

(56) References Cited

FOREIGN PATENT DOCUMENTS

| WO | 2017/134296 | 8/2017 |
| WO | 2017/207687 | 12/2017 |

OTHER PUBLICATIONS

Written Opinion received in corresponding PCT Application PCT/EP2018/084656 dated Apr. 8, 2019 and completed Mar. 27, 2019.

* cited by examiner

COMPOSITION WITH REDUCED ALDEHYDE EMISSION

CROSS-REFERENCE TO RELATED APPLICATIONS

This application is the National Phase of International Application PCT/EP2018/084656 filed Dec. 13, 2018 which claims priority to International Application No. PCT/CN2017/116892 filed Dec. 18, 2017. The noted applications are incorporated herein by reference.

FIELD OF THE INVENTION

This invention relates generally to composition with reduced aldehyde emission and more specially to composition useful in means of transport such as interior part of cars.

BACKGROUND INFORMATION

Emission of formaldehyde and acetaldehyde can cause unpleasant odours and health related problems. Methods of reducing formaldehyde emissions in polyurethane or polyurea (PU) compositions by using scavenger additives are already known in the art. However, known solutions were not able to provide a composition for making a PU foam which can significantly reduce the acetaldehyde emission and still maintain satisfactory mechanic properties for further process. Therefore, it would be desirable to develop a composition suitable for making a PU foam which addresses that problem.

In the prior art, US 20060141236 discloses the use of hydrazine compounds as aldehyde scavengers in polyurethanes. But the viscosity of the compositions is very high.

JP2005124743 discloses the use of aldehyde scavengers (nitrogen-containing organic compound) to reduce aldehyde volatile compounds in PU foam pads. But the aldehyde scavengers used in the prior art is different from the present invention.

EP1428847 discloses an aldehyde scavenger. But it requires an additional post-processing step.

JP 2005154599 discloses some additives that can be used as aldehyde scavenger. But such additives are not suitable for PU foam process.

US 20130203880 discloses the use of polyhydrazodicarbonamide to reduce aldehyde emissions in polyurethane foams. However, it only works when huge amount of polyhydrazodicarbonamide is added, which would influence the mechanic properties of the PU foam. After a thorough prior art study, it is found that none of the documents cited above teaches or suggests the present invention.

SUMMARY OF THE INVENTION

It has now been surprisingly found that the compositions and processes of the present invention address the above problem. Advantages of the present invention may include: (1) reduced aldehyde emission, especially acetaldehyde emission; (2) low cost; and (3) no obvious influence on the mechanic properties of the foam. The present invention is concerned with compositions with reduced aldehyde emission and processes for preparing these compositions. In one embodiment, the invention provides a composition for making a polyurethane foam, said composition comprising: (a) a polyfunctional isocyanate; (b) an isocyanate reactive composition; and (c) a compound of the formula:

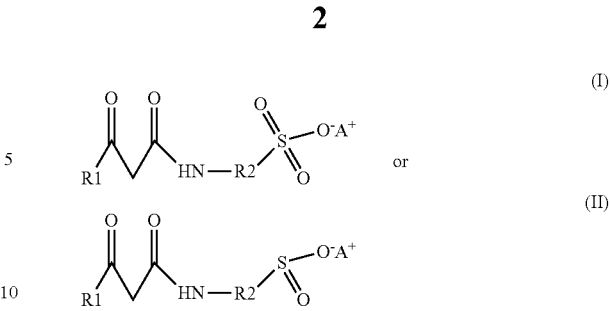

wherein
R1 is selected from hydrogen, hydroxyl, or an unsubstituted or substituted $C_1$-$C_{35}$ alkyl, $C_2$-$C_{35}$ alkenyl, aryl, alkylaryl, or $C_1$-$C_{35}$ alkoxy group,
R2 is selected from a bond, or an unsubstituted or substituted aryl, $C_2$-$C_{35}$ alkenyl, alkylaryl, $C_1$-$C_{35}$ alkoxy, or $C_1$-$C_{35}$ alkyl group,
A is an ion with positive charge,
wherein the compound (c) is present by weight percentage in the composition in an amount ranging from about 0.001 to about 10, preferably from about 0.01 to about 5, and more preferably from about 0.05 to about 2 based on the total weight of the composition.

In another embodiment, the present invention provides a process for preparation of the foam of the invention.

In still another embodiment, the present invention provides a method of using the foam made according to the invention to form an interior part of means of transport.

DETAILED DESCRIPTION

If appearing herein, the term "comprising" and derivatives thereof are not intended to exclude the presence of any additional component, step or procedure, whether or not the same is disclosed herein. In order to avoid any doubt, all compositions claimed herein through use of the term "comprising" may include any additional additive, adjuvant, or compound, unless stated to the contrary. In contrast, the term, "consisting essentially of" if appearing herein, excludes from the scope of any succeeding recitation any other component, step or procedure, excepting those that are not essential to operability and the term "consisting of", if used, excludes any component, step or procedure not specifically delineated or listed. The term "or", unless stated otherwise, refers to the listed members individually as well as in any combination.

The articles "a" and "an" are used herein to refer to one or to more than one (i.e. to at least one) of the grammatical object of the article. By way of example, "a resin" means one resin or more than one resin.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phrases do not necessarily refer to the same embodiment.

If the specification states a component or feature "may", "can", "could", or "might" be included or have a characteristic, that particular component or feature is not required to be included or have the characteristic.

The present invention generally provides a composition for making a polyurethane foam, said composition comprising at least: (a) a polyfunctional isocyanate; (b) an isocyanate reactive composition; and (c) a compound of the formula:

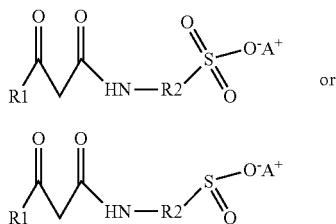

wherein
R1 is selected from hydrogen, hydroxyl, or an unsubstituted or substituted $C_1$-$C_{35}$ alkyl, $C_2$-$C_{35}$ alkenyl, awl, alkylaryl, or $C_1$-$C_{35}$ alkoxy group,
R2 is selected from a bond, or an unsubstituted or substituted aryl, $C_2$-$C_{35}$ alkenyl, alkylaryl, $C_1$-$C_{35}$ alkoxy, or $C_1$-$C_{35}$ alkyl group,
A is an ion with positive charge,
wherein the compound (c) is present by weight percentage in the composition in an amount ranging from about 0.001 to about 10, preferably from about 0.01 to about 5, and more preferably from about 0.05 to about 2 based on the total weight of the composition. According to one embodiment, the polyfunctional isocyanate includes those represented by the formula $Q(NCO)_n$ where n is a number from 2-5, preferably 2-3 and Q is an aliphatic hydrocarbon group containing 2-18 carbon atoms, a cycloaliphatic hydrocarbon group containing 5-10 carbon atoms, an araliphatic hydrocarbon group containing 8-13 carbon atoms, or an aromatic hydrocarbon group containing 6-15 carbon atoms, wherein aromatic hydrocarbon groups are in general preferred.

Examples of polyfunctional isocyanates include, but are not limited to, ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate, and mixtures of these isomers; isophorone diisocyanate; 2,4- and 2,6-hexahydrotoluene diisocyanate and mixtures of these isomers; dicyclohexylmethane-4,4'-diisocyanate (hydrogenated MDI or HMDI); 1,3- and 1,4-phenylene diisocyanate; 2,4- and 2,6-toluene diisocyanate and mixtures of these isomers (TDI); diphenylmethane-2,4'- and/or -4,4'-diisocyanate (MDI); naphthylene-1,5-diisocyanate; triphenylmethane-4,4',4"-triisocyanate; polyphenyl-polymethylene-polyisocyanates of the type which may be obtained by condensing aniline with formaldehyde, followed by phosgenation (polymeric MDI); norbornane diisocyanates; m- and p-isocyanatophenyl sulfonylisocyanates; perchlorinated aryl polyisocyanates; modified polyfunctional isocyanates containing carbodiimide groups, urethane groups, allophonate groups, isocyanurate groups, urea groups, or biruret groups; polyfunctional isocyanates obtained by telomerization reactions; polyfunctional isocyanates containing ester groups; and polyfunctional isocyanates containing polymeric fatty acid groups. Those skilled in the art will recognize that it is also possible to use mixtures of the polyfunctional isocyanates described above, preferably using mixture of polymeric MDI and mixture of MDI isomers, more preferably using polymeric MDI.

In another embodiment, prepolymers of MDI can also be used as an alternative of MDI. Prepolymers of MDI are prepared by the reaction of an MDI and a polyfunctional polyol. The synthesis processes of prepolymers of MDI are known in the art (see for example Polyurethanes Handbook $2^{nd}$ edition, G. Oertel, 1994).

The isocyanate reactive composition suitable for use in the present invention may include polyfunctional polyol or polyfunctional amine.

The polyfunctional polyols for use in the present invention may include, but are not limited to, polyether polyols, polyester polyols, biorenewable polyols, polymer polyols, a non-flammable polyol such as a phosphorus-containing polyol or a halogen-containing polyol. Such polyols may be used alone or in suitable combination as a mixture.

General functionality of polyfunctional polyols used in the present invention is between 2 to 6. The molecular weight of polyols may be between 200 and 10,000, preferably between 400 and 7,000.

Molecular weight (MW) is weight average molecular weight which is defined by Gel Permeation Chromatography (GPC) method with polystyrene as a reference.

The proportion of said polyfunctional polyols is generally of between 10% and 90% by weight, preferably between 30% and 80% based on the composition.

Polyether polyols for use in the present invention include alkylene oxide polyether polyols such as ethylene oxide polyether polyols and propylene oxide polyether polyols and copolymers of ethylene and propylene oxide with terminal hydroxyl groups derived from polyhydric compounds, including diols and triols; for example, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane, and similar low molecular weight polyols.

Polyester polyols for use in the present invention include, but are not limited to, those produced by reacting a dicarboxylic acid with an excess of a diol, for example, adipic acid with ethylene glycol or butanediol, or reaction of a lactone with an excess of a diol such as caprolactone with propylene glycol. In addition, polyester polyols for use in the present invention may also include: linear or lightly branched aliphatic (mainly adipates) polyols with terminal hydroxyl group; low molecular weight aromatic polyesters; polycaprolactones; polycarbonate polyol. Those linear or lightly branched aliphatic (mainly adipates) polyols with terminal hydroxyl group are produced by reacting a dicarboxyl acids with an excess of diols, triols and their mixture; those dicarboxyl acids include, but are not limited to, for example, adipic acid, AGS mixed acid; those diols, triols include, but are not limited to, for example, ethylene glycol, diethylene glycol, propylene glycol, dipropylene glycol, 1,4-butane diol, 1,6-hexane diol, glycerol, trimethylolpropane and pentaerythritol. Those low molecular weight aromatic polyesters include products derived from the process residues of dimethyl terephalate (DMT) production, commonly referred to as DMT still bottoms, products derived from the glycolysis of recycled poly(ethyleneterephthalate) (PET) bottles or magnetic tape with subsequent re-esterification with di-acids or reaction with alkylene oxides, and products derived by the directed esterification of phthalic anhydride. Polycaprolactones are produced by the ring opening of caprolactones in the presence of an initiator and catalyst. The initiator includes ethylene glycol, diethylene glycol, propylene glycol, dipropylene glycol, 1,4-butane diol, 1,6-hexane diol, glycerol, trimethylolpropane and pentaerythritol. Polycarbonate polyols are derived from carbonic acid—that can be produced through the polycondensation of diols with phosgene, although transesterification of diols, commonly hexane diol, with a carbonic acid ester, such as diphenylcarbonate.

Biorenewable polyols suitable for use in the present invention include castor oil, sunflower oil, palm kernel oil, palm oil, canola oil, rapeseed oil, soybean oil, corn oil, peanut oil, olive oil, algae oil, and mixtures thereof.

Examples of polyfunctional polyols also include, but are not limited to, graft polyols or polyurea modified polyols. Graft polyols comprise a triol in which vinyl monomers are graft copolymerized. Suitable vinyl monomers include, for example, styrene, or acrylonitrile. A polyurea modified polyol, is a polyol containing a polyurea dispersion formed by the reaction of a diamine and a diisocyanate in the presence of a polyol. A variant of polyurea modified polyols are polyisocyanate poly addition (PIPA) polyols, which are formed by the in situ reaction of an isocyanate and an alkanolamine in a polyol. The non-flammable polyol may, for example, be a phosphorus-containing polyol obtainable by adding an alkylene oxide to a phosphoric acid compound. A halogen-containing polyol may, for example, be those obtainable by ring-opening polymerization of epichlorohydrine or trichlorobutylene oxide.

In a preferred embodiment, the isocyanate reactive composition is polyether polyol.

The polyfunctional amine for use in the present invention may include polyether polyamine or polyester polyamine.

It is found that adding compound (c) in the composition for making a polyurethane foam of the present invention can reduce the aldehyde emission in the obtained foam.

In one embodiment, R1 is selected from hydrogen, hydroxyl, or an unsubstituted or substituted $C_1$-$C_{35}$ alkyl, $C_2$-$C_{35}$ alkenyl, aryl, alkylaryl, or $C_1$-$C_{35}$ alkoxy group. In a preferred embodiment, R1 is selected from hydrogen, hydroxyl, or an unsubstituted or substituted $C_1$-$C_{17}$ alkyl, $C_2$-$C_{35}$ alkenyl, or aryl group.

In another embodiment, R2 is selected from a bond, or an unsubstituted or substituted aryl, $C_2$-$C_{35}$ alkenyl, alkylaryl, $C_1$-$C_{35}$ alkoxy, or $C_1$-$C_{35}$ alkyl group. In a preferred embodiment, R2 is an unsubstituted or substituted phenylene or naphthylene group.

In still another embodiment, A is an ion with positive charge. In a preferred embodiment, A is an alkali metal cation, an alkaline earth metal cation, a transition metal cation, an ammonium, or a hydrogen ion.

Examples of compound (c) include, but are not limited to, N-(acetoacetyl) sulfanilic acid potassium salt, 3-acetoacetylamino-4-methoxytoluene-6-sulfonic acid ammonium salt, 4-[(1,3-dioxobutyl)amino]-benzenesulfonic acid, sodium 4-acetoacetamidonaphthalene-1-sulfonate, N-acetoacet cresidine sulfonic acid sodium salt, acetoacet-p-sulfonylamide, 7-[(1,3-dioxobutyl)amino]-3-hydroxynaphthalene-1-sulfonic acid, 3-oxo-N-[4-[[2-(sulphooxy)ethyl]sulphonyl]phenyl]butyramide, 4-[(1,3-dioxobutyl)amino]naphthalene-1-sulphonic acid, ammonium7-[(1,3-Dioxobuty)amino]-3-hydroxynaphthalene-1-sulphonate, 2,5-bis[(1,3-dioxobutyl)amino]benzenesulfonic acid, 2,5-bis[(1,3-dioxobutyl)amino]-benzenesulfonic acid potassium salt, 5-methoxy-2-methyl-4-(3-oxobutanoylamino)benzenesulfonic acid, bis[3-[(1,3-dioxobutyl)amino]benzenesulfonic acid]calcium salt, 3-[[3-[4-(Hexadecyloxy)phenyl]-1,3-dioxopropyl]amino]benzenesulfonic acid sodium salt, 5-[(1,3-dioxobutyl)amino]-1-naphthalenesulfonic acid potassium salt, 5-[(1,3-dioxobutyl)amino]-1-naphthalenesulfonicacid ammonium salt, 2-[4-[(1,3-dioxo-3-phenylpropyl)amino]phenyl]-1-octadecyl-1H-benzimidazole-5-sulphonic acid, sodium 2,5-bis(acetoacetylamino)benzenesulfonate, N-(acetoacetyl) sulfanilic acid potassium salt, sodium 4-acetoacetamidonaphthalene-1-sulfonate, trisodium 6-methyl-2-[4-[[2-oxo-1-[[(4-sulphonato-1-naphthyl)amino]carbonyl]propyl]azo]-3-sulphonatophenyl]benzothiazole-7-sulphonate, and 7-benzothiazolesulfonic acid-6-methyl-2-[4-[[2-oxo-1-[[(4-sulfo-1-naphthalenyl)amino]carbonyl]propyl]azo]-3-sulfophenyl]-ammonium sodium salt.

In a preferred embodiment, compound (c) is 3-acetoacetylamino-4-methoxytoluene-6-sulfonic acid ammonium salt, N-acetoacet cresidine sulfonic acid sodium salt or N-(acetoacetyl) sulfanilic acid potassium salt.

The compound (c) is present by weight percentage in the composition according to the invention in an amount ranging from about 0.001 to about 10, preferably from about 0.01 to about 5, and more preferably from about 0.05 to about 2 based on the total weight of the composition.

According to one embodiment, the NCO index of the composition according to the invention is in the range of from about 0.6 to about 1.5, preferably from about 0.8 to about 1.3.

In another embodiment, the NCO index of the composition according to the invention is in the range of from about 1.05 to about 10, preferably from about 1.05 to about 4.

The isocyanate index or NCO index or index is the ratio of NCO-groups over isocyanate-reactive hydrogen atoms present in a formulation,

[NCO]
[active hydrogen]

In other words the NCO-index expresses the amount of isocyanate actually used in a formulation with respect to the amount of isocyanate theoretically required for reacting with the amount of isocyanate-reactive hydrogen used in a formulation.

Unless otherwise specified, aldehyde emissions are measured according to the VDA 276 test method (also called VOC chamber test) which is an emission measurement method to measure the emissions from a foam sample placed in a 1 $m^3$ chamber where the foam is exposed to 65° C. and 5% RH (relative humidity) for several hours. VDA 276 (Verband Der Automobil industrie) is a specific automotive emission method used by a host of automotive OEM's (original equipment manufacturers) to specify the permissible emission levels coming from automotive interior parts.

In the present invention, the composition according to the invention may further include one or more catalysts in order to speed up the reaction between polyfunctional isocyanate and polyfunctional polyol, for example, amine catalyst e.g. N,N-dimethylethanolamine, N,N-dimethyl-N',N'-di(2-hydroxypropyl)-1,3-propanediamine, 2-((2-(2-(dimethylamino)ethoxy)ethyl) methylamino)ethanol, dimethylcyclohexylamine and triethylene diamine.

In one embodiment, the proportion of the catalysts present in the composition according to the invention is of between 0.001 and 10 wt %, preferably between 0.1 and 5 wt %.

In another embodiment, the composition according to the invention may further optionally comprise fire retardants, antioxidants, surfactants, physical or chemical blowing agents, chain extender, crosslinking agent, foam stabilizer, fillers, pigments, or any other typical additives used in PU materials.

Advantages of the inventive composition according to the invention may include: (1) reduced aldehyde emission, especially acetaldehyde emission; (2) low cost; and (3) no obvious influence on the mechanic properties of the foam.

The present invention also provides a process for making a foam using the composition of the present invention, said process comprising mixing components (b) and (c) to form a mixture, and adding the mixture to component (a), wherein the compound (c) is present by weight percentage in the composition in an amount ranging from about 0.001 to about 10, preferably from about 0.01 to about 5, and more preferably from about 0.05 to about 2 based on the total weight of the composition.

Alternatively the process for making a foam using the composition of the present invention, said process comprises mixing at least components (b) and (c) to form a mixture, and adding the mixture to component (a).

Furthermore, the present invention also provides a method of using the foam according to the invention (made using the composition of the present invention) to form an interior part of means of transport.

It can also be applied in other industry areas where the polyurethane (PU) foams are used. These PU foams include flexible PU foam, semirigid PU foam, rigid PU foam, viscoelastic PU foam, integral skin PU foam, hydroponic PU foam and alike.

The examples which now follow should be considered exemplary of the present invention, and not limiting the invention in any way.

Raw Materials
Isocyanate A: SUPRASEC© 7007 (polymeric MDI). Supplier: Huntsman, USA;
Isocyanate B: SUPRASEC® 3056. Supplier: Huntsman, USA;
Isocyanate C: SUPRASEC® 2185. Supplier: Huntsman, USA;
Polyol A: a trifunctional copolymer of ethylene and propylene oxide with terminal hydroxyl groups derived from glycerol; has a molecular weight around 5000 g/mol;
Polyol B: a trifunctional ethylene glycol based polyether polyol; has a molecular weight around 1300 g/mol;
Polyol C: Daltocel® F428. Supplier: Huntsman, USA;
Foam stabilizer: TEGOSTAB® B8734 LF2 (siloxane based surfactant). Supplier: Evonik;
Catalyst A: JEFFCAT® ZF 10 (amine catalyst). Supplier: Huntsman, USA;
Catalyst B: JEFFCAT® DPA (amine catalyst). Supplier: Huntsman, USA;
Scavenger A: N-(acetoacetyl) sulfanilic acid potassium salt;
Scavenger B: 3-acetoacetylamino-4-methoxytoluene-6-sulfonic acid ammonium salt;
Scavenger C: N-acetoacet cresidine sulfonic acid sodium salt;
Scavenger D: Dimethyl 1,3-acetonedicarboxylate
DELA: Diethanolamine
DMEA: Dimethylethanolamine Example 1

Formulation
A Component
Isocyanate A
B Component
91.1 parts by weight Polyol A
3 parts by weight Polyol B
0.5 parts by weight Foam stabilizer
0.2 parts by weight Catalyst A
0.5 parts by weight Catalyst B
0.3 parts by weight Scavenger A
0.5 parts by weight DELA
0.4 parts by weight DMEA
3.5 parts by weight water
Procedure A and B components were mixed in the proportion (by weight) of A:B=1:1.48 and at an index of 1.00 and stirred in a polyethylene container to make the polyuria/polyurethane foam. The resulting composition is rapidly poured into polyethylene bag. The foaming reaction proceeded and the foam is allowed to free rise. The foams are cured for a minimum of 15 min at room temperature before being tested, for each formulation about 1 kg foam was made via hand mix foam procedure for VDA276 emission test.

Example 2

Formulation
A Component
Isocyanate A
B Component
91.1 parts by weight Polyol A
3 parts by weight Polyol B
0.5 parts by weight Foam stabilizer
0.2 parts by weight Catalyst A
0.5 parts by weight Catalyst B
0.3 parts by weight Scavenger B
0.5 parts by weight DELA
0.4 parts by weight DMEA
3.5 parts by weight water
Procedure A and B components were mixed in the proportion (by weight) of A:B=1:1.48 and at an index of 1.00 and stirred in a polyethylene container to make the polyuria/polyurethane foam. The resulting composition is rapidly poured into polyethylene bag. The foaming reaction proceeded and the foam is allowed to free rise. The foams are cured for a minimum of 15 min at room temperature before being tested, for each formulation about 1 kg foam was made via hand mix foam procedure for VDA276 emission test.

Example 3

Formulation
A Component
Isocyanate A
B Component
91.1 parts by weight Polyol A
3 parts by weight Polyol B
0.5 parts by weight Foam stabilizer
0.2 parts by weight Catalyst A
0.5 parts by weight Catalyst B
0.3 parts by weight Scavenger C
0.5 parts by weight DELA
0.4 parts by weight DMEA
3.5 parts by weight water
Procedure A and B components were mixed in the proportion (by weight) of A:B=1:1.48 and at an index of 1.00 and stirred in a polyethylene container to make the polyuria/polyurethane foam. The resulting composition is rapidly poured into polyethylene bag. The foaming reaction proceeded and the foam is allowed to free rise. The foams are cured for a minimum of 15 min at room temperature before being tested, for each formulation about 1 kg foam was made via hand mix foam procedure for VDA276 emission test.

Example 4

Formulation
A Component
Isocyanate A
B Component
91.4 parts by weight Polyol A
3 parts by weight Polyol B
0.5 parts by weight Foam stabilizer
0.2 parts by weight Catalyst A
0.5 parts by weight Catalyst B
0.5 parts by weight DELA
0.4 parts by weight DMEA
3.5 parts by weight water
Procedure A and B components were mixed in the proportion (by weight) of A:B=1:1.48 and at an index of 1.00 and stirred in a polyethylene container to make the polyuria/polyurethane foam. The resulting composition is rapidly poured into polyethylene bag. The foaming reaction proceeded and the foam is allowed to free rise. The foams are cured for a minimum of 15 min at room temperature before being tested, for each formulation about 1 kg foam was made via hand mix foam procedure for VDA276 emission test.

This example is a comparative example.

Results

TABLE 1

|  | Example | | | |
|---|---|---|---|---|
|  | Ex 1 | Ex 2 | Ex 3 | Ex 4 |
| formaldehyde emission [1] [$\mu g/m^3$] | 107 | 77 | 91 | 218 |
| acetaldehyde emission [1] [$\mu g/m^3$] | 21 | 22 | 26 | 41 |
| propionaldehyde emission [1] [$\mu g/m^3$] | 20 | 14 | 18 | 35 |

[1] Tested according to VDA276

With an addition of aldehyde scavengers, there is significant reduction of formaldehyde, acetaldehyde and propionaldehyde emission of the foam as shown in Table 1.

Example 5

Formulation
A Component
Isocyanate A
B Component
89.2 parts by weight Polyol A
2.9 parts by weight Polyol B
0.5 parts by weight Foam stabilizer
0.2 parts by weight Catalyst A
0.5 parts by weight Catalyst B
2.4 parts by weight Scavenger A
0.5 parts by weight DELA
0.4 parts by weight DMEA
3.4 parts by weight water
Procedure A and B components were mixed in the proportion (by weight) of A:B=1:1.48 and at an index of 1.00 and stirred in a polyethylene container to make the polyuria/polyurethane foam. The resulting composition is rapidly poured into polyethylene bag. The foaming reaction proceeded and the foam is allowed to free rise. The foams are cured for a minimum of 15 min at room temperature before being tested, for each formulation about 1 kg foam was made via hand mix foam procedure for VDA276 emission test.

Example 6

Formulation
A Component
Isocyanate A
B Component
88.1 parts by weight Polyol A
2.9 parts by weight Polyol B
0.5 parts by weight Foam stabilizer
0.2 parts by weight Catalyst A
0.5 parts by weight Catalyst B
3.5 parts by weight Scavenger A
0.5 parts by weight DELA
0.4 parts by weight DMEA
3.4 parts by weight water
Procedure A and B components were mixed in the proportion (by weight) of A:B=1:1.48 and at an index of 1.00 and stirred in a polyethylene container to make the polyuria/polyurethane foam. The resulting composition is rapidly poured into polyethylene bag. The foaming reaction proceeded and the foam is allowed to free rise. The foams are cured for a minimum of 15 min at room temperature before being tested, for each formulation about 1 kg foam was made via hand mix foam procedure for VDA276 emission test.

This example is a comparative example.

Results

Samples of Examples 1 to 5 could form normal PU foams. Sample of Example 6 could not form normal PU foam but collapsed foam.

TABLE 2

|  | Example | | |
|---|---|---|---|
|  | Ex 1 | Ex 5 | Ex 4 |
| Core density [1] [$kg/m^3$] | 56 | 55 | 57 |
| 40% CLD [1] [2] | 8.11 | 8.33 | 8.06 |
| Hysteresis loss(PV3427) CLD [1] [2] | 26 | 27.3 | 26.3 |
| Tensile strength at break [1] | 167 | 148 | 169 |
| Elongation at break [1] | 74 | 72 | 74 |
| 50% Compression set [1] | 23.13 | 20.43 | 23.22 |

[1] Tested according to TL526 53 at 23° C. and 50% relative humidity.
[2] compression load deflection With an addition of aldehyde scavengers, there is no significant influence of the mechanic properties of the foam of the invention as shown in Table 2. However, when the amount of aldehyde scavenger is too high, it would cause foam collapsing.

Example 7

Formulation
A Component
80 parts by weight Isocyanate B
20 parts by weight Isocyanate C
B Component
93.8 parts by weight Polyol C
0.8 parts by weight Foam stabilizer
0.1 parts by weight Catalyst A
0.9 parts by weight Catalyst B
0.4 parts by weight Scavenger A
0.2 parts by weight DELA
3.8 parts by weight water
Procedure A and B components were mixed in the proportion (by weight) of A:B=1:1.66 and at an index of 0.98 and stirred in a polyethylene container to make the polyuria/polyurethane foam. The resulting composition is rapidly poured into polyethylene bag. The foaming reaction proceeded and the foam is allowed to free rise. The foams are cured for a minimum of 15 min at room temperature before being tested, for each formulation about 1 kg foam was made via hand mix foam procedure for VDA276 emission test.

Example 8

Formulation

A Component 80 parts by weight Isocyanate B 20 parts by weight Isocyanate C

B Component 93.8 parts by weight Polyol C 0.8 parts by weight Foam stabilizer 0.1 parts by weight Catalyst A 0.9 parts by weight Catalyst B 0.4 parts by weight Scavenger D 0.2 parts by weight DELA 3.8 parts by weight water Procedure A and B components were mixed in the proportion (by weight) of A:B=1:1.66 and at an index of 0.98 and stirred in a polyethylene container to make the polyuria/polyurethane foam. The resulting composition is rapidly poured into polyethylene bag. The foaming reaction proceeded and the foam is allowed to free rise. The foams are cured for a minimum of 15 min at room temperature before being tested, for each formulation about 1 kg foam was made via hand mix foam procedure for VDA276 emission test.

This example is a comparative example.

Example 9

Formulation

A Component 80 parts by weight Isocyanate B 20 parts by weight Isocyanate C

B Component 94.1 parts by weight Polyol C 0.9 parts by weight Foam stabilizer 0.1 parts by weight Catalyst A 0.9 parts by weight Catalyst B 0.2 parts by weight DELA 3.8 parts by weight water Procedure A and B components were mixed in the proportion (by weight) of A:B=1:1.66 and at an index of 0.98 and stirred in a polyethylene container to make the polyuria/polyurethane foam. The resulting composition is rapidly poured into polyethylene bag. The foaming reaction proceeded and the foam is allowed to free rise. The foams are cured for a minimum of 15 min at room temperature before being tested, for each formulation about 1 kg foam was made via hand mix foam procedure for VDA276 emission test.

This example is a comparative example.

Results

TABLE 3

| | Example | | |
|---|---|---|---|
| | Ex 7 | Ex 8 | Ex 9 |
| formaldehyde emission [1] [µg/m³] | 100 | 44 | 206 |
| acetaldehyde emission [1] [µg/m³] | 17 | 177 | 32 |
| propionaldehyde emission [1] [µg/m³] | 90 | 136 | 136 |

[1] Tested according to VDA276

With an addition of Scavenger D, there is reduction of the emission of formaldehyde but no effect on the emission of acetaldehyde or propionaldehyde. However, with an addition of the scavenger of the invention, there is significant reduction of the emission of both formaldehyde and acetaldehyde as shown in Table 3. This suggests that the scavengers of the invention which conjugated system with electron withdrawing group has better effect on the reduction of acetaldehyde emission than the scavenger of Example 8.

What is claimed is:

1. A composition for making a polyurethane foam, said composition comprising at least:
   (a) a polyfunctional isocyanate;
   (b) an isocyanate reactive composition; and
   (c) a compound of the formula:

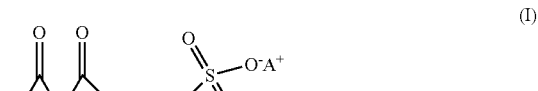

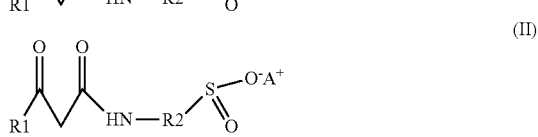

wherein R1 is selected from hydrogen, hydroxyl, or an unsubstituted or substituted $C_1$-$C_{17}$ alkyl, a $C_2$-$C_{38}$ alkenyl, or aryl group, R2 is selected from a bond or an unsubstituted or substituted phenylene or naphthylene, A is an ion with a positive charge, wherein the compound (c) is present by weight percentage in the composition in an amount ranging from about 0.001 to about 2 based on the total weight of the composition.

2. The composition of claim 1, wherein the NCO index of the composition is in the range of from about 0.6 to about 1.5.

3. The composition of claim 1, wherein the NCO index of the composition is in the range of from about 1.05 to about 10.

4. The composition of claim 1, wherein the polyfunctional isocyanate is selected from a polymeric methylene diphenyl diisocyanate, a methylene diphenyl diisocyanate isomer mixture, or a mixture thereof.

5. The composition of claim 1, wherein the isocyanate reactive composition is a polyfunctional polyol or a polyfunctional amine.

6. The composition of claim 1, wherein A is an alkali metal cation, an alkaline earth metal cation, a transition metal cation, an ammonium, or a hydrogen ion.

7. The composition of claim 1, wherein the composition further comprises at least one catalyst.

8. The composition of claim 7, wherein the catalyst comprises an amine catalyst.

9. The composition of claim 1, wherein the composition further comprises at least one blowing agent.

10. The composition of claim 1, wherein the composition further comprises at least one chain extender.

11. A process for making the foam of claim 1, comprising mixing at least components (a), (b) and (c) to form a mixture, and adding the mixture to component (a).

12. A process for making the foam of claim 1, comprising mixing at least components (b) and (c) to form a mixture, and adding the mixture to component (a).

13. A method of using the composition of claim 1, to form an interior part of means of transport.

14. The composition of claim 5, wherein the isocyanate reactive composition is a polyether polyol.

* * * * *